Dec. 13, 1949  R. FEITL  2,491,306
RETAINING RING
Filed Nov. 21, 1945  3 Sheets-Sheet 1
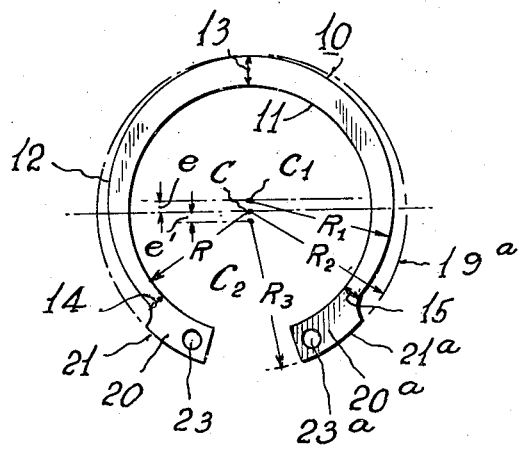
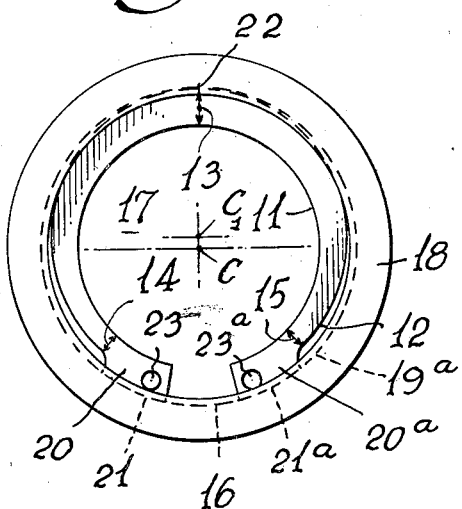
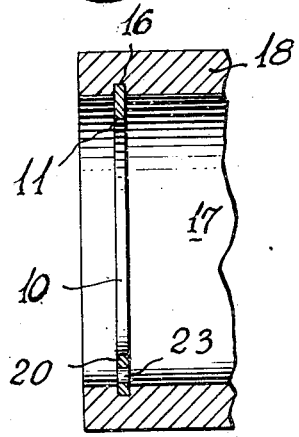
Inventor
Rudolf Feitl,
By J. Harold Kilcoyne
Attorney Dec. 13, 1949  R. FEITL  2,491,306
RETAINING RING
Filed Nov. 21, 1945  3 Sheets-Sheet 2
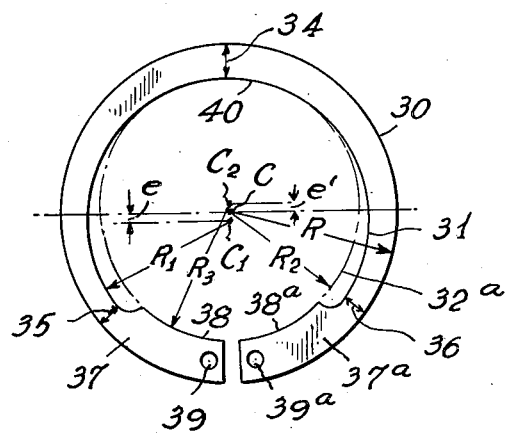
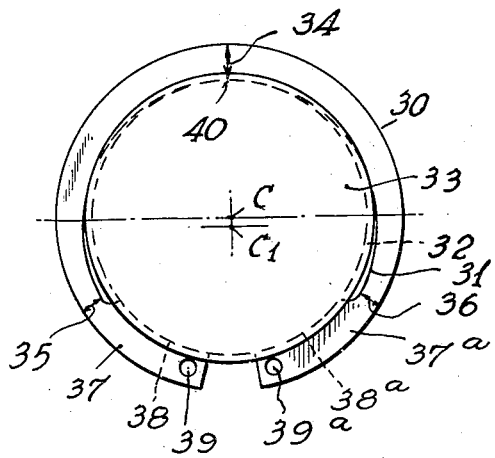
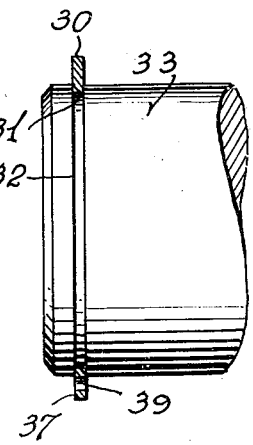
Inventor
Rudolf Feitl,
By Harold Kilcoyne
Attorney Dec. 13, 1949 R. FEITL 2,491,306
RETAINING RING
Filed Nov. 21, 1945 3 Sheets-Sheet 3
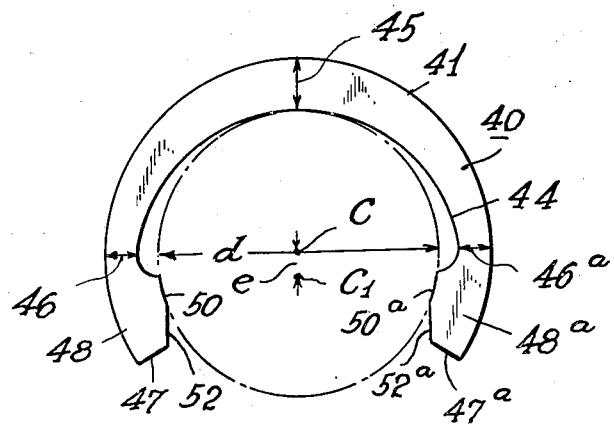
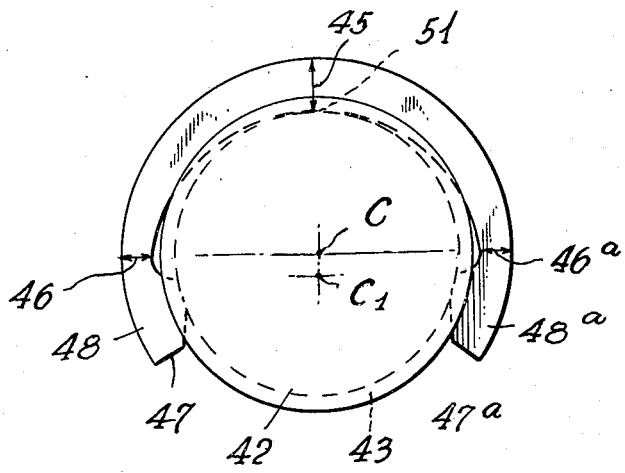
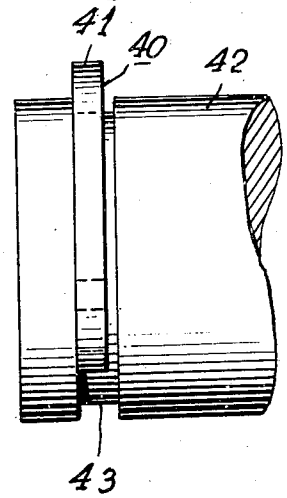
Inventor
Rudolf Feitl,
Attorney Patented Dec. 13, 1949

2,491,306

UNITED STATES PATENT OFFICE 2,491,306

RETAINING RING

Rudolf Feitl, Brooklyn, N. Y., assignor to Waldes Koh-I-Noor, Inc., Long Island City, N. Y., a corporation of New York Application November 21, 1945, Serial No. 629,974

10 Claims. (Cl. 85—8.5)

This invention relates to improvements in retaining rings of the type adapted to be sprung into a seating groove provided therefor in a shaft, housing bore or like carrying member and thereupon to provide an artificial shaft or bore shoulder capable of securing machine parts against axial displacement.

As usually constructed, retaining rings of the character to which the invention pertains are of two main types. One type, which embraces both the so-called external and internal rings, consists of a substantially closed split ring, the width of the gap between the free ends thereof being as small as possible for convenient assembly and disassembly. Rings of this type are applied by being spread over the end of the carrying shaft (external ring) or contracted to pass into the housing bore (internal ring), and while maintained in this stressed state are thereupon shifted in axial direction along the shaft or bore to the plane of the seating groove in which they snap after being released.

The other main type is the so-called "open" retaining ring which functions as an external ring only, and consists of a ring segment which subtends between its free legs an angle that only slightly exceeds 180°. The "open" retaining ring possesses the advantage that it can be spread directly over the shaft in the plane of its seating groove, and hence has especial utility for retaining ring applications which do not permit of the ring being shifted axially along the shaft in its assembly or disassembly.

The earlier rings of both of the aforementioned types were characterized by uniform section height throughout their circumferences, with the result that they deformed ovally rather than circularly when spread or contracted. The prior conventional "open" retaining rings of uniform section height had the additional disadvantage that the gap between the free legs thereof had to be comparatively large in order to avoid overspreading of the ring as it was spread directly over the shaft in the plane of the seating groove, the large gap resulting in shorter arcuate length of the ring segment and a consequent looser fit of the ring against the bottom of its seating groove than was desirable.

Later developments in the design of the substantially closed rings, as disclosed by U. S. Reissue Patent No. 18,144, dated August 4, 1931, and of the "open" retaining rings, as disclosed in U. S. Patent No. 2,382,948, dated August 14, 1945, resulted in the rings being formed with a continuous taper, i. e. with a diminishing section height from their middle sections to their free ends, the tapering construction insuring effective circularity of the ring under deformation and permitting formation of the ring with an internal diameter smaller than that of the circle of the groove bottom, in the case of external rings, and with an external diameter greater than that of the groove bottom, in the case of internal rings. In both cases, a tighter pressure fit of ring against the bottom of its seating groove and a correspondingly increased security of the ring assembly was obtained. In the case of the "open" external rings which are assembled directly over the shaft in the plane of the seating groove, the tapered construction provides the additional advantage of a smaller gap between the ring legs and consequently a greater arcuate length of ring segment, the latter contributing to a more secure seating of the ring in its groove.

However, while the tapered rings are highly efficient in the majority of cases, there are ring applications in which they meet with the objection that, because of their tapered construction, and the fact that they protrude unequally from the shaft or into the bore of the housing, thus to form a shoulder of non-uniform depth, they do not provide as secure an abutment for a machine part having corner radii or chamfers as does a ring giving a uniform depth of shoulder.

The present invention seeks in its broader aspects to provide an improved retaining ring which possesses the known advantages of the tapered ring but which additionally provides a practically uniform depth shoulder throughout its circumference. More specifically, the invention contemplates improved retaining rings of the substantially closed type, both internal and external, as well as of the external "open" type, having tight pressure fit against the bottom of their seating grooves, which maintain circularity under deformation, i. e. when spread or contracted, which have in the case of the "open" ring the desirable feature of substantial arcuate length, and which at the same time protrude a uniform distance from the circle of their seating groove so as to provide a uniform depth shoulder throughout their arcuate length.

Other objects will be in part obvious and in part pointed out hereinafter in connection with the following detailed description taken with the accompanying drawings, in which—

Fig. 1 is a plan view of a substantially closed retaining ring of the so-called internal type according to the invention;

Fig. 2 is an end view of a housing and internal ring assembly illustrating the uniform depth shoulder provided by an improved ring as shown in Fig. 1;

Fig. 3 is a section taken through the assembly shown in Fig. 2;

Figs. 4, 5 and 6 are views corresponding to Figs. 1–3, inclusive, and which illustrate an external, substantially closed type ring according to the invention and its assembly on a shaft, pin, or the like;

Fig. 7 is a plan view of an "open" retaining ring according to the invention; and Figs. 8 and 9 are end and side views, respectively, of a shaft and ring assembly incorporating the improved open ring shown in Fig. 7.

Referring to Figs. 1, 2 and 3 illustrating the improved internal ring of the invention and the manner in which upon assembly it provides a uniform depth shoulder within a housing bore, reference character 10 designates a substantially closed-type retaining ring made from spring metal, preferably spring steel. As shown, the inner or shoulder forming edge 11 of the ring extends throughout its full arcuate length along a circular arc of constant radius R from the center C. The outer edge 12 of the ring body is also circular, but is eccentric to the inner edge, being formed with radius $R^1$ from center $C^1$, the eccentricity $e$ of said centers being in the direction of the middle section 13 of the ring body. By the eccentric arrangement of outer to inner ring edges, the ring tapers from its largest section height (middle section 13) to leg sections or points 14, 15 having smallest section height and which are spaced from the free ends of the ring by ears or lugs 20, 20a. In the illustrated embodiment under description, the lugs protrude radially outwardly from the ring body and are formed with adequate arcuate length as to provide secure seating of the ring in its groove, as will become hereinafter apparent.

Referring particularly to Fig. 2 illustrating the ring 10 seated in a groove 16 of uniform depth provided for its reception in the bore 17 of a housing 18, the present invention proposes that the center C of the ring inner edge 11 shall coincide with the center of the circle of the housing bore 17 and hence that said edge be concentric both with the circle of bore 17 and the circle 19a (Fig. 1) of the bottom of the ring groove 16, so as to protrude an equal distance within the bore 17, despite the tapered construction of the ring. Considering that the ring is slightly stressed (contracted) when seated, the concentricity of ring inner edge with circle of bore 17 requires that the ring deform circularly, which requirement is satisfied by its tapered construction, that the lugs at the end of the ring have section height (radial depth) equal to that of the ring middle section 13, and finally that the lugs be so constructed that their outer edges extend as arcs of a circle of radius equalling radius $R^2$ of the groove bottom circle and whose center is adapted to coincide with the center C when the ring is stressed (contracted) to seat in its groove.

To this end, the lugs 20, 20a, whose inner circular edges are segments of the inner circular edge 11 of the ring, have their outer edges 21, 21a formed as arcs of a circle of radius $R^3$ containing the point 22 on the outer edge of the ring at its middle section 13, said radius $R^3$ equalling radius $R^2$ of the groove bottom circle since the lugs 20, 20a are in the nature of rigid parts which as a practical matter do not deform. As seen in Fig. 1, it is a further feature of the invention that the center $C^2$ for radius $R^3$ is eccentric in the opposite direction from the eccentricity of the center $C^1$ of the outer edge 12 from the ring center C by a chosen amount $e'$ which corresponds substantially to the amount of radial inward movement of the ring lugs as the ring contracts in seating. Accordingly, when the ring is mounted, i. e. spring-seated in its groove, the circle containing the point 22 on the outer edge of the ring at its middle portion and the outer arcuate edges 21, 21a of the lugs coincides with the circle 19a of the groove bottom, and hence center $C^2$ of the former circle coincides with the ring and shaft center C.

Due to the substantial arcuate length of the outer edges of the lugs 20, 20a, taken with the tendency of the ring to return to its initially unstressed state in which center $C^2$ is out of coincidence with the ring and shaft center C, the ring has tight pressure fit against the groove bottom, which is a feature of advantage in preventing relative rotation between ring and shaft and between ring and machine part secured thereby.

In summary, the above described ring construction results in the center C of the inner or shoulder forming edge 11 of the ring being concentric with the circle 19a of the bottom of the ring seating groove 16 and hence of the housing bore 17. Since radius R is by design substantially less than both the radius $R^2$ and the radius of the bore circle, the inner edge 11 of the ring protrudes equally into the bore all around and thus provides a uniform depth shoulder throughout its circumference.

As shown, the ring lugs or ears are provided with apertures 23, 23a adapted to receive the working points of plier-like handling tools by which the ring may be contracted for assembly and disassembly.

Referring to Figs. 4, 5 and 6 illustrating the improved external ring of tapered construction adapted to form a uniform depth shoulder all around, reference characters 30, 31 designate, respectively, the outer and inner edges of a retaining ring adapted to seat in a groove 32 provided in a shaft 33, the outer edge 30 extending along a circular arc of radius R from ring (and shaft) center C, the inner edge 31 extending along an arc of radius $R^1$ from center $C^1$ which is eccentric from center C in the direction opposite to that of the ring middle section 34 by the eccentricity $e$. Due to this eccentric relationship of inner to outer edges, the ring tapers from its middle section 34 of maximum section height to points of minimum section height 35, 36 which are spaced from the free ends of the ring by ears or lugs 37, 37a, the latter having adequate arcuate length as will insure firm seating of the ring.

The outer edges of the lugs 37, 37a are formed as segments of the circle 30 of the outer ring edge, whereas their inner edges 38, 38a, which are adapted to seat against the bottom of the shaft groove 32, extend along a circular arc of radius $R^3$ which is equal to the radius $R^2$ of the circle 32a of the groove bottom 32. By reference to Fig. 4, it will be seen that center $C^2$ for radius $R^3$ is eccentric to ring and shaft center C by the eccentricity $e^1$ which is in the direction opposite to the eccentricity of center $C^1$ from center C, and which is calculated to correspond to the radial outward movement of the lugs 37, 37a in ring assembly, this arrangement insuring that center $C^2$ substantially coincides with ring center C when the ring is mounted, and hence that the inner circular edges 38, 38a of the ring lugs have tight pressure fit against the groove bottom.

By the described ring construction, the ring upon its assembly in groove 32 has pressure fit against the groove bottom along the inner edges 38, 38a of the lugs and also along the inner ring edge portion designated 40 adjacent the middle section 34 thereof. Due to its tapered construction, i. e. eccentricity of inner to outer edge, the ring is adapted to maintain its circularity under deformation and at the same time to provide a uniform depth shoulder all around, the latter because the ring outer edge is concentric with the circles of the groove bottom and of the shaft.

The ring ears or lugs are provided with holes 39, 39a, as is conventional, which are adapted to receive the working points of a spreading and handling tool.

Referring now to Figs. 7, 8 and 9 illustrating an "open" retaining ring according to the invention, reference character 40 indicates generally a ring segment of spring metal having arcuate length which substantially exceeds 180°, but which is nevertheless not such as would preclude assembly of the ring on a shaft directly in the plane of the seating groove. The outer edge 41 of the ring segment is formed as a circular arc with C as its center point, which is also the center point of the shaft 42 on which the ring is to be assembled and which is provided with a ring seating groove 43. The inner edge 44 of the ring segment extends along a circular arc struck from a center $C^1$ which is eccentric from center C in the direction opposite to that of the ring middle section 45 by the distance $e$. Accordingly, the ring segment tapers or has diminishing section height from its mid-section 45 to points 46, 46a of smallest section height which are spaced from the ends 47, 47a of the ring segment by internal lugs 48, 48a.

The outer edges of the lugs extend as arcs of the circle of the outer edge 41 of the ring segment proper, whereas the inner or bearing edges 50, 50a of the lugs extend as arcs of a circle which, when the ring is stressed, coincides with the circle of the groove bottom 43, relative to which the inner edge 44 of the ring segment is eccentric and the outer edge 41 is concentric, as shown. Hence, upon the "open" type ring being seated in its shaft groove 43, it is enabled not only to maintain circularity when spread but also to provide a uniform depth shoulder all around, as is more clearly illustrated in Fig. 8. Preferably, for the modification under description, the diameter of the part circular arcs of the inner edges 50, 50a of the ring lugs is slightly less than the diameter of the circle of the groove bottom, so as to insure tight fit of the lugs against the groove bottom, with the ring in effect being secured along said lug edges and also along the opposite ring edge portion 51.

Preferably, the edges 52, 52a connecting the inner bearing edges of the lugs with the ring end edges 47, 47a are angled as shown, the resulting angular surfaces providing good attacking points for a tool by which the ring can be removed from the groove when disassembly is desired.

Without further analysis, it will be observed that the various forms of ring above described are characterized by the desirable continuously tapered construction permitting the ring to maintain circularity under deformation, i. e. when spread or contracted, and at the same time a ring providing a uniform depth artificial shoulder throughout its arcuate length is achieved. Moreover, by the proper proportioning of radius of the ring ear or lug bearing edges relative to the radius of the seating groove circle, a secure pressure fit of the ring within its groove is obtained. In the case of the open retaining ring as shown in Figs. 7, 8 and 9, the invention provides an open ring having considerable arcuate length which nevertheless is not sufficiently great as to interfere with assembly of the ring directly in the plane of its seating groove.

As many changes could be made in carrying out the above constructions without departing from the scope of the invention, it is intended that all matter contained in the above description or shown in the accompanying drawings shall be interpreted as illustrative and not in a limiting sense.

I claim:

1. A retaining ring of the type adapted to be sprung into a seating groove provided therefor in a circular carrying member to form an artificial, uniform-depth shoulder thereon, said ring comprising an open-ended ring body whose shoulder-defining edge extends for its full arcuate length as the major arc of a circle and whose opposite edge is eccentrically disposed to the shoulder-defining edge in such manner that the section heights of the ring body decrease progressively from its middle portion towards its free end, whereby the ring body is adapted to maintain circularity in deformation, said free ends being provided with arcuately shaped lugs having appreciable arcuate length and a section height which substantially equals that of the middle portion of the ring body, the groove-engaging edges of the lugs extending as arcs of a circle concentric to the shoulder-defining edge and whose diameter is substantially equal to the diameter of the bottom of the groove.

2. A retaining ring as set forth in claim 1 wherein the ends of the ring are spaced by a small width gap.

3. A retaining ring as set forth in claim 1, wherein the ring body subtends an arc that does not greatly exceed 180°.

4. A retaining ring as set forth in claim 1, wherein the lugs protrude radially outwardly so that their outer edges and the outer edge of the ring body at its middle portion form the groove-seating edge of the ring.

5. A retaining ring as set forth in claim 1, wherein the lugs protrude radially inwardly so that their inner edges and the inner edge of the ring at its middle portion form the groove-seating edge of the ring.

6. A retaining ring assembly comprising a circular carrying member having a uniform depth groove, a retaining ring spring-seated in said groove and providing an artificial, uniform-depth shoulder on said member, said ring comprising an open-ended ring body whose shoulder defining edge extends for its full arcuate length as the major arc of a circle and whose groove-seating edge is eccentrically arranged to the shoulder-defining edge in such manner that the section heights of the ring body decrease progressively from its middle portion towards its free ends whereby the ring maintains circularity in deformation, said free ends being formed as arcuately shaped lugs having appreciable arcuate length and a section height which substantially equals that of the ring middle portion, said lugs being seated in the groove and their groove-seating edges extending as arcs of a circle which is substantially concentric with the shoulder-defining edge of the ring and with the circle of the carrying member, and whose diameter is substantially equal to that of the bottom of the groove.

7. A retaining ring assembly as set forth in claim 6, wherein the ring is of nearly closed construction according to which the free ends of the ring are spaced by a small width gap.

8. A retaining ring assembly as set forth in claim 6, wherein the ring is of open construction according to which the ring subtends an arc which is not substantially greater than 180°.

9. A retaining ring assembly as set forth in claim 6, wherein the carrying member comprises a housing having a bore and said ring provides an internal shoulder which protrudes radially into the bore.

10. A retaining ring assembly as set forth in claim 6, wherein the carrying member comprises a shaft-like part and said ring provides an external shoulder on said shaft-like part.

RUDOLF FEITL.

REFERENCES CITED

The following references are of record in the file of this patent:

UNITED STATES PATENTS

| Number | Name | Date |
| --- | --- | --- |
| Re. 18,144 | Heierman | Aug. 4, 1931 |
| 2,131,948 | Graham | Oct. 4, 1938 |
| 2,382,947 | Brozek | Aug. 14, 1945 |